United States Patent [19]
Coldren et al.

[11] Patent Number: 5,961,045
[45] Date of Patent: Oct. 5, 1999

[54] CONTROL VALVE HAVING A SOLENOID WITH A PERMANENT MAGNET FOR A FUEL INJECTOR

[75] Inventors: Dana R. Coldren, Fairbury; Charles D. Ellenbecker, Normal; Matthew S. Touvelle, Peoria, all of Ill.; Ching W. Jaw, Phoenix, Ariz.

[73] Assignee: Caterpillar Inc., Peoria, Ill.

[21] Appl. No.: 08/937,911

[22] Filed: Sep. 25, 1997

[51] Int. Cl.⁶ .................................................. F02M 51/00
[52] U.S. Cl. ..................... 239/90; 239/585.2; 239/585.3; 251/129.02; 251/129.16; 251/129.17
[58] Field of Search ............ 239/88–91, 585.1, 239/585.2, 585.3; 251/129.02, 129.16, 129.17, 65; 335/229–234

[56] References Cited

U.S. PATENT DOCUMENTS

| | | | |
|---|---|---|---|
| 3,379,214 | 4/1968 | Weinberg | 137/625.5 |
| 3,731,881 | 5/1973 | Dixon et al. | 239/585.1 |
| 4,532,951 | 8/1985 | Fermanich | 137/84 |
| 4,653,720 | 3/1987 | Knapp et al. | 251/65 |
| 4,690,373 | 9/1987 | Linder et al. | 251/129.02 |
| 4,717,118 | 1/1988 | Potter | 251/129.02 |
| 4,848,727 | 7/1989 | Nanbu et al. | 251/129.16 |
| 4,869,462 | 9/1989 | Logie et al. | 251/129.16 |
| 4,905,907 | 3/1990 | Ricco | 239/533.8 |
| 4,988,967 | 1/1991 | Miller et al. | 335/279 |
| 5,106,053 | 4/1992 | Miller et al. | 251/129.05 |
| 5,110,087 | 5/1992 | Studtmann et al. | 251/129.16 |
| 5,125,807 | 6/1992 | Kohler et al. | 417/490 |
| 5,188,336 | 2/1993 | Graner et al. | 251/129.16 |
| 5,238,224 | 8/1993 | Horsting | 251/129.16 |
| 5,240,227 | 8/1993 | Sich | 251/129.16 |
| 5,244,180 | 9/1993 | Wakeman et al. | 251/129.16 |
| 5,353,991 | 10/1994 | De Nagel et al. | 239/409 |
| 5,407,131 | 4/1995 | Maley et al. | 239/90 |
| 5,434,549 | 7/1995 | Hirabayashi et al. | 335/229 |
| 5,474,234 | 12/1995 | Maley | 239/88 |
| 5,494,219 | 2/1996 | Maley et al. | 239/88 |
| 5,546,063 | 8/1996 | Hoffman | 335/229 |
| 5,605,289 | 2/1997 | Maley et al. | 239/585.1 |
| 5,651,501 | 7/1997 | Maley et al. | 239/88 |
| 5,718,264 | 2/1998 | Sturman | 137/625.65 |
| 5,809,157 | 9/1998 | Grumazescu | 381/199 |

*Primary Examiner*—Andres Kashnikow
*Assistant Examiner*—Lisa A. Douglas
*Attorney, Agent, or Firm*—Michael B. McNeil

[57] ABSTRACT

A control valve, preferably for use with a fuel injector, includes a valve body defining an inlet passage separated from an outlet passage by a valve seat. A solenoid is attached to the valve body, and includes a coil and an armature. A portion of the armature is a permanent magnet. The polarity of the permanent magnet is oriented such that the armature is pushed away from the coil when the solenoid is energized. A valve member is positioned in the valve body and attached to the armature. The valve member is moveable between an open position in which the inlet passage is open to the outlet passage, and a closed position in which the inlet passage is closed to the outlet passage.

20 Claims, 4 Drawing Sheets

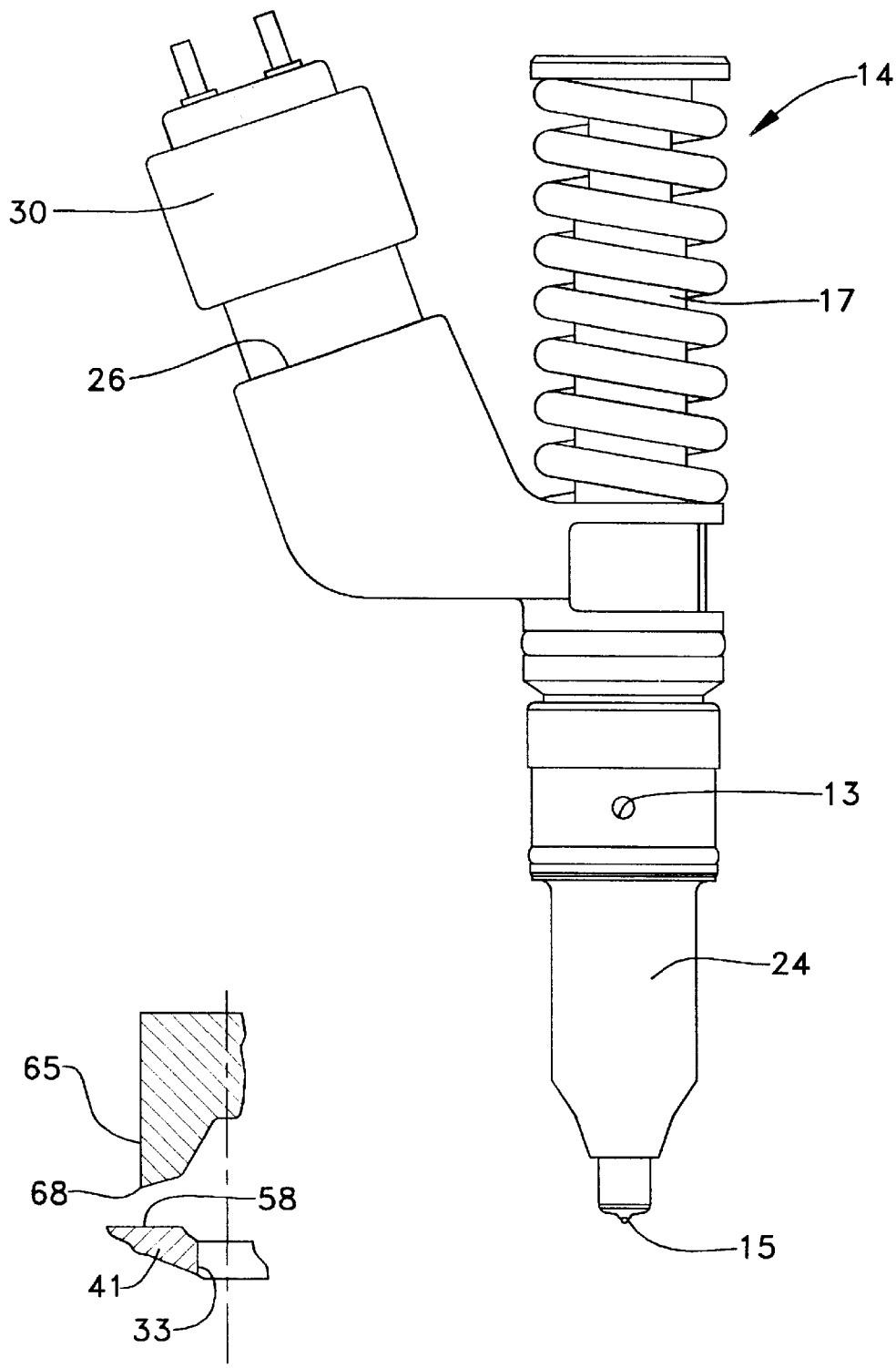

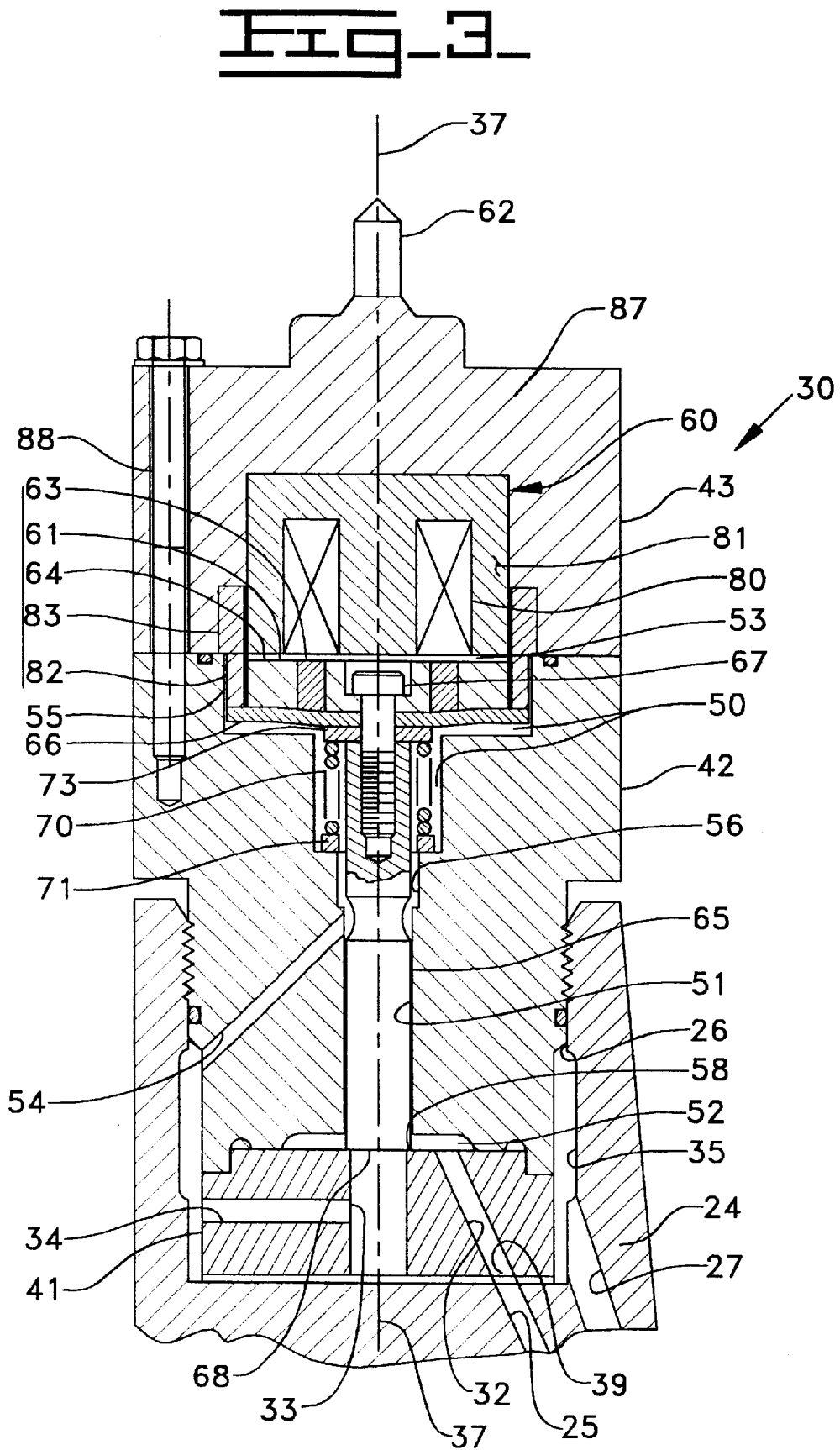
Fig_3

Fig_5_
COIL "ON"
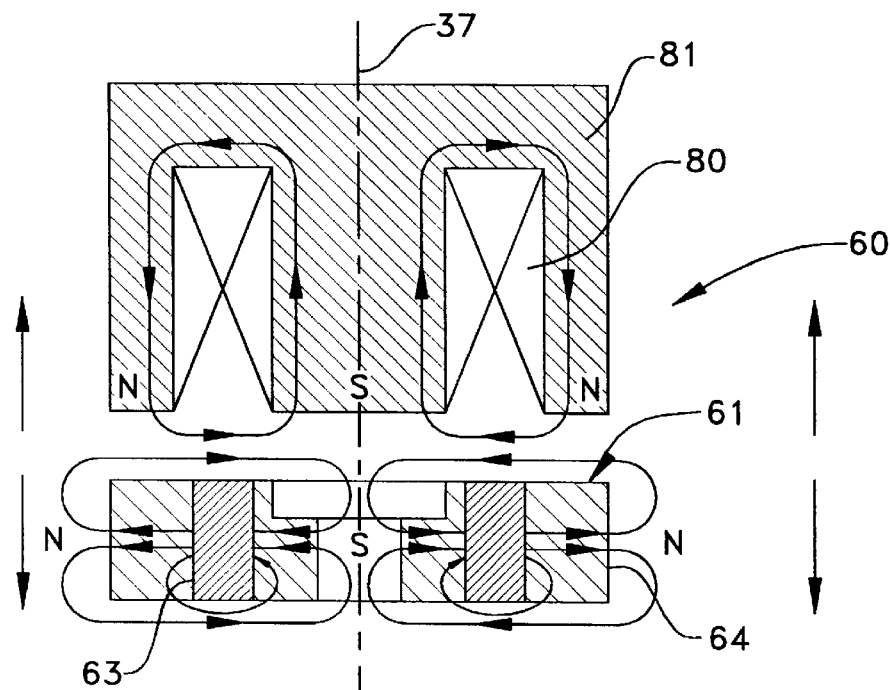
Fig_6_
COIL "OFF"
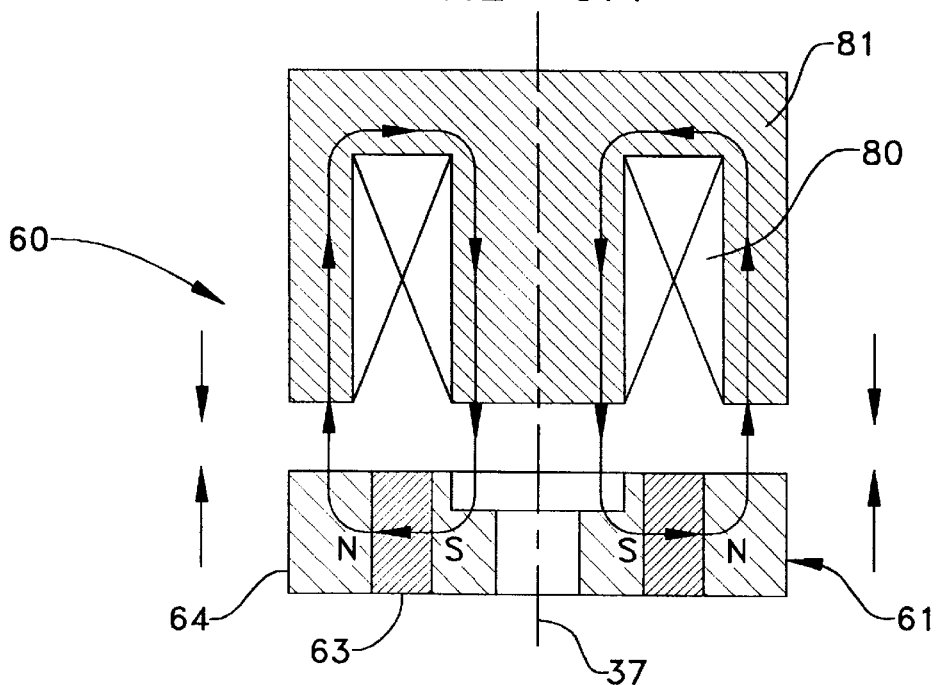

CONTROL VALVE HAVING A SOLENOID WITH A PERMANENT MAGNET FOR A FUEL INJECTOR

TECHNICAL FIELD

The present invention relates generally to control valves for fuel injectors, and more particularly to control valves having a solenoid armature that includes a permanent magnet.

BACKGROUND ART

Examples of electronically controlled cartridge control valves for fuel injectors are shown in U.S. Pat. No. 5,494,219 to Maley et al., U.S. Pat. No. 5,407,131 to Maley et al., U.S. Pat. No. 4,869,462 to Logie et al., and U.S. Pat. No. 4,717,118 to Potter. In each of these examples, the injector includes a mechanically actuated fuel pumping plunger and an electronically actuated fuel pressure control valve assembly. The pressure control valve assembly includes a solenoid operated poppet valve that controls fuel pressure in the injector in order to control fuel injection delivery. Fuel pressure is controllably enabled to be developed within the injector by electrical actuation of the pressure control valve assembly. Fuel pressure is controllably prevented from developing within the injector by not electrically actuating the pressure control valve so that fuel can spill through a return passage while the plunger is undergoing a portion of its pumping stroke.

In such electronically controlled fuel injectors, the armature of the pressure control valve assembly moves the poppet valve in one direction until it engages a valve seat, and holds the poppet valve in its closed position to enable fuel pressure to be developed in the injector, eventually resulting in fuel injection. At the end of the fuel injection cycle, the solenoid is de-energized, and a return spring moves the poppet valve member off the valve seat, returning the poppet valve member to its open position, which prevents the development of fuel pressure by spilling the fuel back to a fuel reservoir.

In these prior art control valves, the armature is pulled toward the coil when the solenoid is energized. Because the coil must typically be embedded deep within the control valves' body, space constraints often limit the size of the coil and hence the amount of force that the solenoid can produce. This in turn limits the actuating speed of the valve and complicates the construction of the same, both by the difficulty of incorporating a solenoid within the valve body and by the increased number of components necessary to do the same.

The present invention is directed to overcoming one or more of the problems set forth above.

DISCLOSURE OF THE INVENTION

In one embodiment, a control valve includes a valve body that defines an inlet passage separated from an outlet passage by a valve seat. A solenoid is attached to the valve body, and includes a coil and an armature. A portion of the armature is a permanent magnet. The polarity of the permanent magnet is oriented such that the armature is pushed away from the coil when the solenoid is energized. A valve member is positioned in the valve body and attached to the armature. The valve member is moveable between an open position in which the inlet passage is open to the outlet passage, and a closed position in which the inlet passage is closed to the outlet passage.

In another embodiment, the valve body has a centerline. The armature is positioned between the coil and the valve member along the centerline.

In still another embodiment, a fuel injector includes an injector body that defines a nozzle outlet and a cartridge opening, and further defines a spill passage and a return passage that open into the cartridge opening. A cartridge control valve having a valve body is received in the cartridge opening and attached to the injector body. The valve body defines an inlet passage separated from an outlet passage by a valve seat. The inlet passage opens to the spill passage, and the outlet passage opens to the return passage. A solenoid is attached to the valve body and includes a coil and an armature. A portion of the armature is a permanent magnet. The polarity of the permanent magnet is oriented such that the armature is pushed away from the coil when the solenoid is energized. A valve member is positioned in the valve body and attached to the armature. The valve member is moveable between an open position in which the inlet passage is open to the outlet passage, and a closed position in which the inlet passage is closed to the outlet passage.

BRIEF DESCRIPTION OF THE DRAWINGS

FIG. 2 is an elevational view of a fuel injector incorporating a cartridge control valve according to one embodiment of the present invention.

FIG. 3 is a partially sectioned side elevational view of a cartridge control valve according to the present invention.

FIG. 4 is a fragmented sectional view illustrating a flat valve seat and a valve member with knife edge valve surface in accordance with one aspect of the present invention.

FIG. 5 is a partial sectioned view illustrating magnetic field lines in the area around the armature and coil when the solenoid is energized, according to another aspect of the present invention.

FIG. 6 is a partial sectioned view illustrating magnetic field lines in the area around the armature and coil when the solenoid is de-energized.

BEST MODE FOR CARRYING OUT THE INVENTION

Figure 1:
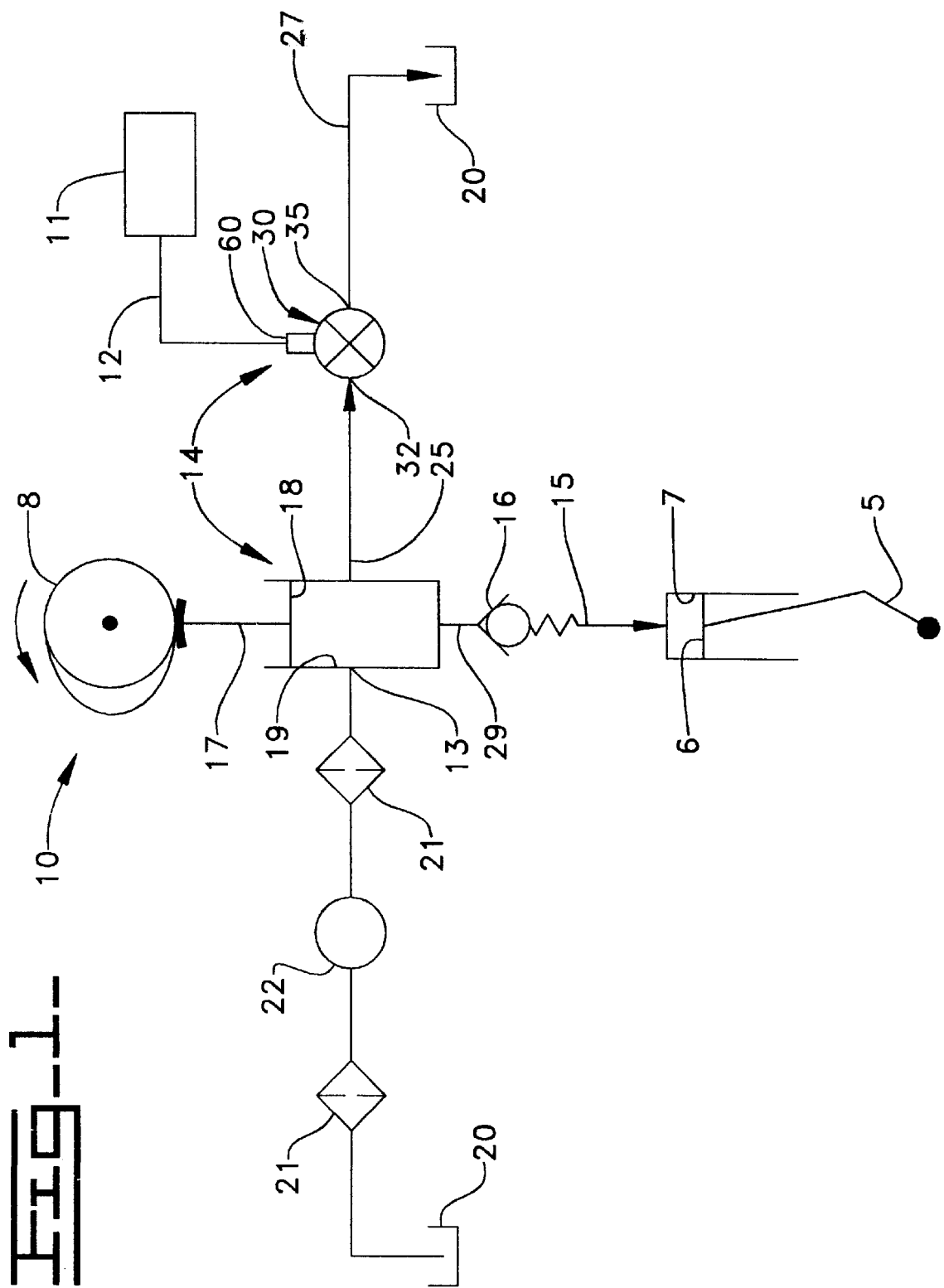
FIG. 1 is a schematic diagram illustrating a mechanically actuated electronically controlled fuel injection system.

In the drawings, the same reference numerals designate the same elements for features throughout all of the drawings.

Referring now to FIG. 1, there is illustrated an injector fuel system 10 adapted for a diesel-cycle direct-injection internal combustion engine having a number of engine pistons, only one of which is shown, i.e. piston 6. Each engine piston and corresponding engine cylinder would have a different fuel injector 14. Each engine piston 6 reciprocates in a separate cylinder 7 due to rotation of the engine drive shaft 5 in a conventional manner. Drive shaft 5 also rotates cam 8 which acts upon a tappet 17 of each injector 14 to mechanically actuate the injectors with each revolution of the engine.

Fuel injection system 10 includes a fuel source or tank 20. Fuel is drawn from fuel tank 20 by a relatively low pressure transfer pump 22, which carries the fuel through one or more fuel filters 21 to the fuel inlet 13 of each injector 14. With each revolution of cam 8, tappet 17 drives a pump piston 18 downward in pump chamber 19. Pump chamber 19 is connected to a spill passage 25 and a nozzle chamber 29 within injector 14. When fuel pressure within pumping chamber 19 is above a valve opening pressure, needle check valve 16 opens and fuel commences to pray into cylinder 7 through nozzle outlet 15. The fuel is prevented from reaching the valve opening pressure as long as spill passage 25 is open.

Spill passage 25 is connected to an inlet passage 32 of cartridge control valve 30. An outlet passage 35 from cartridge control valve 30 is connected to a return passage 27, which in turn is connected back to fuel tank 20 for recirculation. Fuel injection is controlled by opening and closing cartridge control valve 30 to open and close fluid communication between inlet passage 32 and outlet passage 35. This opening and closing of cartridge control valve 30 is controlled by a conventional electronic control module 11 that commands the energization or de-energization of a solenoid 60 via a communication line 12 in a conventional manner.

Referring now to FIG. 2, an example injector 14 according to the present invention is illustrated. Fuel injector 14 includes an injector body 24, a fuel inlet 13, a nozzle outlet 15 and a cartridge opening 26 formed in injector body 24. A cartridge control valve 30 is received in cartridge opening 26 and attached to injector body 24. Spill passage 25 and return passage 27 are defined by injector body 24 and open into cartridge opening 26.

Referring now to FIG. 3, the inner structure of cartridge control valve 30 is illustrated. Cartridge control valve 30 includes a valve body made up of a plurality of cylindrically shaped body components 41, 42 and 43 that are attached to one another in a manner well known in the art. In this embodiment, valve body component 43 is attached to body component 42 with a plurality of fasteners 88, only one of which is shown. Valve body component 42 includes outer threads that mate to inner threads machined in cartridge opening 26 of injector body 24. When cartridge control valve 30 is attached to injector body 24, its inlet passage 32 is connected to a spill passage 25, which is connected to the pump chamber within the injector as discussed earlier. Also, an annular outlet passage 35 is connected to a return passage 27. A poppet valve member 65 is mounted within the valve body and reciprocates between an open position in which annular outlet passage 35 is open to inlet passage 32 via a vertical outlet passage 33 and a plurality of horizontal outlet passages 34, only one of which is shown. Poppet valve member 65 can also be moved to a closed position in which inlet passage 32 is closed to annular outlet passage 35.

The various body components of cartridge control valve 30 are preferably attached to one another in a way that seals against leakage of fuel out of cartridge control valve 30. The valve body defines an inner cavity 50 within which is mounted a portion of valve member 65 and an armature portion of solenoid 60. Poppet valve member 65 is attached to armature 61 of solenoid 60 via a conventional screw 67. A metering passage 54 extends between inner cavity 50 and annular outlet passage 35 so that inner cavity 50 is wetted but is sealed against leakage to the outside of cartridge control valve 30 in a conventional manner. In this embodiment, a portion of metering passage 54 includes a diametrical clearance area that is located between a portion of poppet valve member 65 and an enlarged diameter portion 56 of guide bore 51.

A return spring 70, which is assisted by permanent magnet armature 61, normally biases poppet valve member 65 upward to its open position. The upward force of return spring 70 and the magnetic attraction from armature 61 is trimmed during manufacture of cartridge control valve 30 through the use of a trimming spacer 71. A travel spacer 73 having an appropriate thickness is chosen to define the movement distance of poppet valve member 65 in a conventional manner. Both spacers may be made from non-magnetic material to further magnetically isolate armature 61 from valve body component 42 and valve member 65, if the same are made from a magnetizable material.

Referring now also to FIG. 4, valve body component 41 is machined to include a relatively flat annular valve seat 58 that defines a portion of a spill cavity 52, which itself is defined by the joinder of valve body components 41 and 42. One end of poppet valve member 65 is machined to include an annular knife edge valve surface 68 that closes spill cavity 52 to vertical passage 33 when seated against flat valve seat 58. Thus, return spring 70 and the magnetic attraction force from permanent magnet armature 61 normally bias annular knife edge 68 away from flat valve seat 58 as shown in FIG. 4.

As shown in FIGS. 3, 5, and 6, armature 61 has an outside diameter that is greater than the inside diameter of coil 80. Armature 61 preferably includes a permanent magnet 63 made from a material such as samarium-cobalt that is surrounded by a ferromagnetic material 64. The permanent magnet has its poles oriented such that it is pushed away from coil 80 and flux carrier 81 when solenoid 60 is energized as shown in FIG. 5. An armature carrier 66, which is preferably made from a non-magnetic metallic alloy, is positioned between spacer 73 and the underside of armature 61 in order to further the magnetic isolation of armature 61 from valve member 65 and valve body component 42. Travel spacer 73 and carrier 66 could be combined into a single component. A gap minimum spacer 82 is mounted around permanent magnet armature 61 and serves to insure that there is space 53 between armature 61 and magnetic flux carrier 81. Minimum gap spacer 82 can be made from a ferromagnetic material in order to increase the operable magnetic field of armature 61, providing that radial space 55 is sufficiently large. Spacer 82 comes in contact with the underside of armature stop 83 when return spring 70 and the permanent magnetic force from armature 61 pushes valve member 65 upward toward its open position.

In order to simplify the assembly of control valve 30, armature stop 83, magnetic flux carrier 81, coil 80, terminal 62 and intervening electrical conductors are molded into a cap overmold 87, which is preferably made from a non-electrically conducting and non-magnetic plastic material, such as nylon. This insures that valve body component 43 essentially behaves as an integral one piece component when control valve 30 is assembled during production.

When solenoid 60 is energized, poppet valve member 65 is pushed downward to seat annular knife edge 60 against flat valve seat 58 to close fluid communication between inlet passage 32 and annular outlet passage 35. Poppet valve member 65 is preferably hydraulically balanced by having a first hydraulic surface area exposed to fluid pressure in inner cavity 50 that is about equal to a second hydraulic surface area (end 68) that is exposed to fluid pressure in vertical outlet passage 33. Thus, except for fluid pressure gradients existing between inner cavity 50 and vertical outlet passage 33, the only forces acting on poppet valve member 65 should originate from solenoid 60, return spring 70 and the permanent magnet portion of armature 61. In some cases, it may be possible to eliminate return spring 70 by instead relying upon the attraction between permanent magnet armature 61 and magnetic flux carrier 81 when solenoid 60 is de-energized as shown in FIG. 6.

Although the high fuel pressures existing in inlet passage 32 and spill cavity 52 during an injection event will inevitably cause a small amount of fuel to leak along the outer surface of poppet valve member 65 along guide bore 51, inner cavity 50 is substantially isolated from inlet passage 32 when poppet valve member 65 is in its closed position. However, when poppet valve member 65 is in its open position, inner cavity 50 is in fluid communication with inlet passage 32 via spill cavity 52, vertical spill passage 33, horizontal spill passages 34, outlet passage 35 and most importantly metering passage 54. The use of a wetted inner cavity 50 permits the fuel within this area to damp the movement of poppet valve 65 so that it does not bounce back toward its closed position upon contacting its back stop at its open position. Metering passage 54 also serves to relieve any excess fluid pressure in inner cavity 50 so that poppet valve member 65 remains hydraulically balanced.

INDUSTRIAL APPLICABILITY

The control valve of the present invention finds potential application in any valve in which a solenoid is used to open and close the valve. Since the orientation of the polarity of the permanent magnet armature causes the same to be pushed away from the solenoid coil when the solenoid is energized, the control valve of the present invention finds particular application in cases where space constraints limit the size of the coil that can be positioned within a valve body. By utilizing a pushing force instead of a pulling force, as in a conventional solenoid actuated valve, the present invention allows the solenoid coil to be moved to an outer portion of the valve body, instead of being embedded within the same. This in turn often allows for a larger coil, which can produce a larger force and hasten the response time of the valve. Furthermore, an armature that includes a permanent magnet portion can also in some instances permit the elimination of a return spring (see FIG. 6), since the permanent magnet armature will be attracted to the magnetic flux carrier, which is around the coil, when the solenoid is deactivated.

Although the present invention finds potential application in a wide variety of valving applications, it is particularly applicable for use as a control valve in fuel injectors. The present invention is particularly suited as a cartridge control valve for the mechanically actuated electronically controlled fuel injectors of the type manufactured by Caterpillar, Inc. of Peoria, Ill.

Those skilled in the art will appreciate that numerous modifications and alternative embodiments of the present invention will be apparent in view of the foregoing description. For instance, the complete armature could be a permanent magnet. Accordingly, this description is to be construed as illustrative only and is for the purpose of teaching those skilled in the art the best mode of carrying out the invention. The details of the structure may be varied substantially without departing from the spirit of the invention, the scope of which is defined in terms of the claims as set forth below.

We claim:

1. A control valve comprising:
    a valve body defining an inlet passage separated from an outlet passage by a valve seat;
    a solenoid attached to said valve body, and including a coil with an inside diameter and an armature with an outside diameter greater than said inside diameter, and a portion of said armature being a permanent magnet;
    a polarity of said permanent magnet being oriented such that said armature is pushed away from said coil when said solenoid is energized; and
    a valve member positioned in said valve body and attached to said armature, and being movable between an open position in which said inlet passage is open to said outlet passage, and a closed position in which said inlet passage is closed to said outlet passage.

2. The control valve of claim 1 wherein said valve member includes an annular knife edge valve surface; and
    said valve seat is a flat valve seat.

3. The control valve of claim 1 further comprising a compression spring positioned in said valve body and operable to bias said valve member toward said open position.

4. The control valve of claim 1 further comprising a magnetic flux carrier mounted in said valve body and surrounding a portion of said coil; and
    said armature is magnetically isolated from said magnetic flux carrier by space.

5. The control valve of claim 1 wherein said valve body has a centerline; and
    said armature is positioned between said coil and said valve member along said centerline.

6. The control valve of claim 1 wherein a portion of said armature is a ferromagnetic material.

7. The control valve of claim 1 wherein said armature is magnetically isolated from said valve body by space.

8. A control valve comprising:
    a valve body with a centerline and defining an inlet passage separated from an outlet passage by a valve seat;
    a solenoid attached to said valve body, and including a coil and an armature, and a portion of said armature being a permanent magnet;
    a polarity of said permanent magnet being oriented such that said armature is pushed away from said coil when said solenoid is energized;
    a valve member positioned in said valve body and attached to said armature, and being movable between an open position in which said inlet passage is open to said outlet passage, and a closed position in which said inlet passage is closed to said outlet passage; and
    said armature being positioned between said coil and said valve member along said centerline.

9. The control valve of claim 8 further comprising a magnetic flux carrier mounted in said valve body and surrounding a portion of said coil; and
    said armature is magnetically isolated from said magnetic flux carrier by space.

10. The control valve of claim 9 wherein said armature is magnetically isolated from said valve body by space.

11. The control valve of claim 10 further comprising a compression spring positioned in said valve body and operable to bias said valve member toward said open position.

12. The control valve of claim 10 wherein said valve surface is an annular knife edge valve surface; and
    said valve seat is a flat valve seat.

13. The control valve of claim 10 wherein a portion of said armature is a ferromagnetic material.

14. A fuel injector comprising;
    an injector body defining a nozzle outlet and a cartridge opening, and further defining a spill passage and a return passage that open into said cartridge opening;
    a cartridge control valve with a valve body and being received in said cartridge opening and attached to said injector body;
    said valve body defining an inlet passage separated from an outlet passage by a valve seat, and said inlet passage opening to said spill passage, and said outlet passage opening to said return passage;

a solenoid attached to said valve body, and including a coil and an armature, and a portion of said armature being a permanent magnet;

a polarity of said permanent magnet being oriented such that said armature is pushed away from said coil when said solenoid is energized; and a valve member positioned in said valve body and attached to said armature, and being movable between an open position in which said inlet passage is open to said outlet passage, and a closed position in which said inlet passage is closed to said outlet passage.

15. The fuel injector of claim 14 further comprising a magnetic flux carrier mounted in said valve body and surrounding a portion of said coil; and said armature is magnetically isolated from said magnetic flux carrier by space.

16. The fuel injector of claim 15 wherein said armature is positioned between said coil and said valve member along a line.

17. The fuel injector of claim 16 further comprising a compression spring positioned in said valve body and operable to bias said valve member toward said open position.

18. The fuel injector of claim 17 wherein said valve surface is an annular knife edge valve surface; and said valve seat is a flat valve seat.

19. The fuel injector of claim 18 wherein said armature is magnetically isolated from said valve body by space.

20. The fuel injector of claim 19 wherein a portion of said armature is a ferromagnetic material.

* * * * *